United States Patent Office 2,751,409
Patented June 19, 1956

2,751,409

PREPARATION OF THIOLALKYLAMIDES

Richard Kuhn and Günter Quadbeck, Heidelberg, Germany

No Drawing. Application August 2, 1951, Serial No. 240,042

2 Claims. (Cl. 260—558)

This application relates to new thiol compounds, their preparation and use in reshaping animal fiber. We have discovered that these compounds may be prepared by reacting ethylenimine with thiocarboxylic acid having the general formula

R—CO—SH
R—CS—OH or

The reaction is believed to follow the following general course

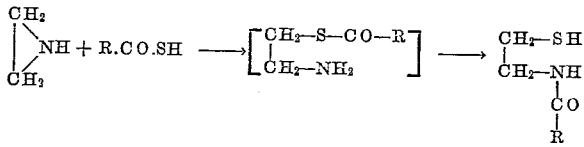

In these formulas R represents an alkyl or aryl hydrocarbon radical.

The reaction of the two starting materials begins with development of heat on simple mixing of the components and is completed by warming the reaction mixture. In some cases it is advantageous to carry out the reaction in an inert solvent or dilution medium as well as with the exclusion of oxygen and at times in the presence of a catalytic additive. The reaction product may be liquid or solid, depending on the starting material, and can be purified by conventional methods such as vacuum distillation or crystallization from organic solvents.

These new products can serve as intermediates in the synthesis of other organic materials as well as for use in reshaping animal fiber for cosmetic or industrial purposes.

Example 1

250 ml. thioacetic acid is dissolved in 700 ml. absolute methanol and reacted with 142 g. ethylenimine at a temperature in the approximate range 5°–10° C. The mixture is boiled for ½ hour under a reflux condenser. Thereafter the solvent is distilled off and the residue is distilled in vacuum. The product (H·S·CH$_2$·CH$_2$·NH·CO·CH$_3$)

boils at 138°–140° C. at 7 mm. Hg.

Example 2

128 g. ethylenimine is dissolved in 150 ml. ether and reacted with 41 g. thiobenzoic acid at –10° C. and then boiled for 3 hours under the reflux condenser. After removal of ether by distillation, a thick oil is obtained as residue which solidifies to a crystal mass after long standing in the cold. Vacuum distillation of this product (H·S·CH$_2$·CH$_2$·NH·CO·C$_6$H$_5$) results in a product having a melting point of 71° C. after recrystallization from ether.

The thiol products of this application have the property in dilute aqueous solution of plasticizing animal fibers such as hair, wool, leather, tendon and the like. They have less toxicity than have many products used for cosmetic purposes, and accordingly may be used for straightening or waving human hair at will. They may also be used for forming relatively permanent creases in woolen fabrics and the like.

Example 3

A tress of naturally kinky human hair was immersed in a weakly ammoniacal 2–4% aqueous solution of the product of Example 1 for a period of 10 minutes. It was then removed and, while still moist, was manipulated to straighten the individual hairs. After drying, the hair retained the new desired form. In a similar way naturally straight hair may be immersed in the solution, waved and dried, after which it will retain its waved form. If desired, the thus treated hair may be given an after treatment with a dilute oxidizing material such as dilute hydrogen peroxide.

Example 4

A woolen fabric was folded lengthwise and the fold moistened with a 2% solution of the product of Example 1. After drying by pressing with a hot iron, the fabric retained the crease relatively permanently.

We claim:

1. The process of preparing a compound having the formula H·S·CH$_2$·CH$_2$·NH·CO·R in which R represents a group selected from the class consisting of lower alkyl and mono-carbocyclic aryl hydrocarbon radicals which comprises mixing substantially equimolecular amounts of ethylenimine and a thio compound selected from the class consisting of R-thionic and R-thiolic carboxylic acids, R representing a group selected from the class consisting of lower alkyl and mono-carbocyclic aryl hydrocarbon radicals permitting the compounds to react with the evolution of heat, and then heating the mixture to complete the reaction.

2. The process of preparing a compound having the formula H·S·CH$_2$·CH$_2$·NH·CO·R in which R represents a group selected from the class of lower alkyl and mono-carbocyclic aryl hydrocarbon radicals, which comprises mixing ethyleneimine and a thio compound selected from the class of R-thionic and R-thiolic carboxylic acids, R representing a group selected from the class consisting of lower alkyl and mono-carbocyclic aryl hydrocarbon radicals, in an inert organic solvent, permitting the compounds to react and then heating the mixture to complete the reaction.

References Cited in the file of this patent

UNITED STATES PATENTS

| | | |
|---|---|---|
| 2,288,178 | Bestian | June 30, 1942 |
| 2,418,071 | Harris | Mar. 25, 1947 |
| 2,434,562 | Harris | Jan. 13, 1948 |
| 2,510,522 | Rust | June 6, 1950 |
| 2,548,774 | Coe | Apr. 10, 1951 |
| 2,615,828 | Haefele | Oct. 28, 1952 |
| 2,642,332 | Cohen | June 16, 1953 |
| 2,677,681 | Gill | May 4, 1954 |
| 2,694,696 | Melamed | Nov. 16, 1954 |

FOREIGN PATENTS

| | | |
|---|---|---|
| 117,071 | Australia | June 17, 1943 |

OTHER REFERENCES

Goldberg et al.: "J. Chem. Soc." (London), 1948, pp. 1919–26.

Lindstrom-Lang et al.: "J. Biol. Chem.," vol. 137 (1941), pp. 443–55.